United States Patent
Adams et al.

(10) Patent No.: US 11,073,430 B2
(45) Date of Patent: Jul. 27, 2021

(54) HIGH-VOLTAGE DEVICE FEATURING TEMPERATURE MEASUREMENT, AND METHOD FOR MEASURING THE TEMPERATURE OF A HIGH-VOLTAGE DEVICE

(71) Applicant: SIEMENS AKTIENGESELLSCHAFT, Munich (DE)

(72) Inventors: Thomas Adams, Cologne (DE); Tim Schnitzler, Kreuzau (DE); Joachim Titze, Ratingen (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 16/082,585

(22) PCT Filed: Mar. 10, 2016

(86) PCT No.: PCT/EP2016/055177
§ 371 (c)(1),
(2) Date: Sep. 6, 2018

(87) PCT Pub. No.: WO2017/152985
PCT Pub. Date: Sep. 14, 2017

(65) Prior Publication Data
US 2019/0094081 A1    Mar. 28, 2019

(51) Int. Cl.
*G01K 11/32* (2021.01)
*H01B 17/00* (2006.01)
(Continued)

(52) U.S. Cl.
CPC .......... *G01K 11/32* (2013.01); *H01B 17/005* (2013.01); *H01B 17/28* (2013.01); *G01K 13/00* (2013.01)

(58) Field of Classification Search
CPC .......... G01J 5/08; G01J 5/0818; G01J 5/0096; G01J 5/14; A61B 2017/00084;
(Continued)

(56) References Cited

U.S. PATENT DOCUMENTS 4,689,483 A * 8/1987 Weinberger ............ G01K 11/14
  250/205
4,904,080 A * 2/1990 Afromowitz ...... G01N 21/4133
  250/227.14
(Continued)

FOREIGN PATENT DOCUMENTS

CN    102338673 B      1/2014
DE    019950111 C1 *  2/2001
(Continued)

OTHER PUBLICATIONS

CN111220881A, Nov. 18, 2019.*

*Primary Examiner* — Gail Kaplan Verbitsky
(74) *Attorney, Agent, or Firm* — Laurence Greenberg; Werner Stemer; Ralph Locher

(57) ABSTRACT

A high-voltage device has an inner conductor and an insulating member that surrounds the inner conductor along the longitudinal direction thereof. In order to increase the reliability of the high-voltage device, at least one optical waveguide rests against the inner conductor in at least some sections, extends out of the insulating member and can be connected to an evaluation unit for recording measured temperature values. Furthermore a method measures a temperature of the inner conductor of the high-voltage device.

9 Claims, 1 Drawing Sheet

(51) Int. Cl.
*H01B 17/28* (2006.01)
*G01K 13/00* (2021.01)

(58) Field of Classification Search
CPC ...... G01R 15/24; H01B 17/28; H01B 17/005; H01K 11/12; G01K 11/12; G01K 11/32; G01K 13/00
USPC .............. 374/161, 130, 131, 185, 152, 208; 356/43, 44
See application file for complete search history.

(56) References Cited

U.S. PATENT DOCUMENTS

| | | | | |
|---|---|---|---|---|
| 5,004,913 | A * | 4/1991 | Kleinerman | G01J 5/08 250/227.21 |
| 5,163,321 | A * | 11/1992 | Perales | G01K 13/02 73/152.52 |
| 6,886,977 | B2 * | 5/2005 | Kaminski | G01K 11/32 250/227.14 |
| 10,014,676 | B2 | 7/2018 | Engels et al. | |
| 10,191,090 | B2 * | 1/2019 | Blake | G01R 31/66 |
| 10,438,723 | B2 * | 10/2019 | Titze | H01B 7/423 |
| 2002/0175001 | A1 | 11/2002 | Lepley et al. | |
| 2004/0071185 | A1 * | 4/2004 | Syracuse | G01K 11/32 374/131 |
| 2007/0116401 | A1 * | 5/2007 | Xia | G01N 21/774 385/12 |
| 2007/0171958 | A1 * | 7/2007 | Hoang | G01J 5/041 374/161 |
| 2008/0218758 | A1 * | 9/2008 | Xia | G01K 11/3206 356/437 |
| 2015/0103862 | A1 * | 4/2015 | Wei | G01J 5/0066 374/121 |
| 2016/0161346 | A1 * | 6/2016 | Schorb | G01K 11/32 374/161 |
| 2019/0334051 | A1 * | 10/2019 | Fafard | H01L 31/0687 |
| 2020/0038095 | A1 * | 2/2020 | Vayser | A61B 90/30 |

FOREIGN PATENT DOCUMENTS

| | | | | |
|---|---|---|---|---|
| DE | 10005164 | A1 | 8/2001 | |
| EP | 3428934 | A1 * | 1/2019 | ............ H01B 17/28 |
| JP | H04296409 | A | 10/1992 | |
| WO | WO-2007112937 | A2 * | 10/2007 | ......... G01D 5/35364 |
| WO | 2015172806 | A1 | 11/2015 | |

* cited by examiner

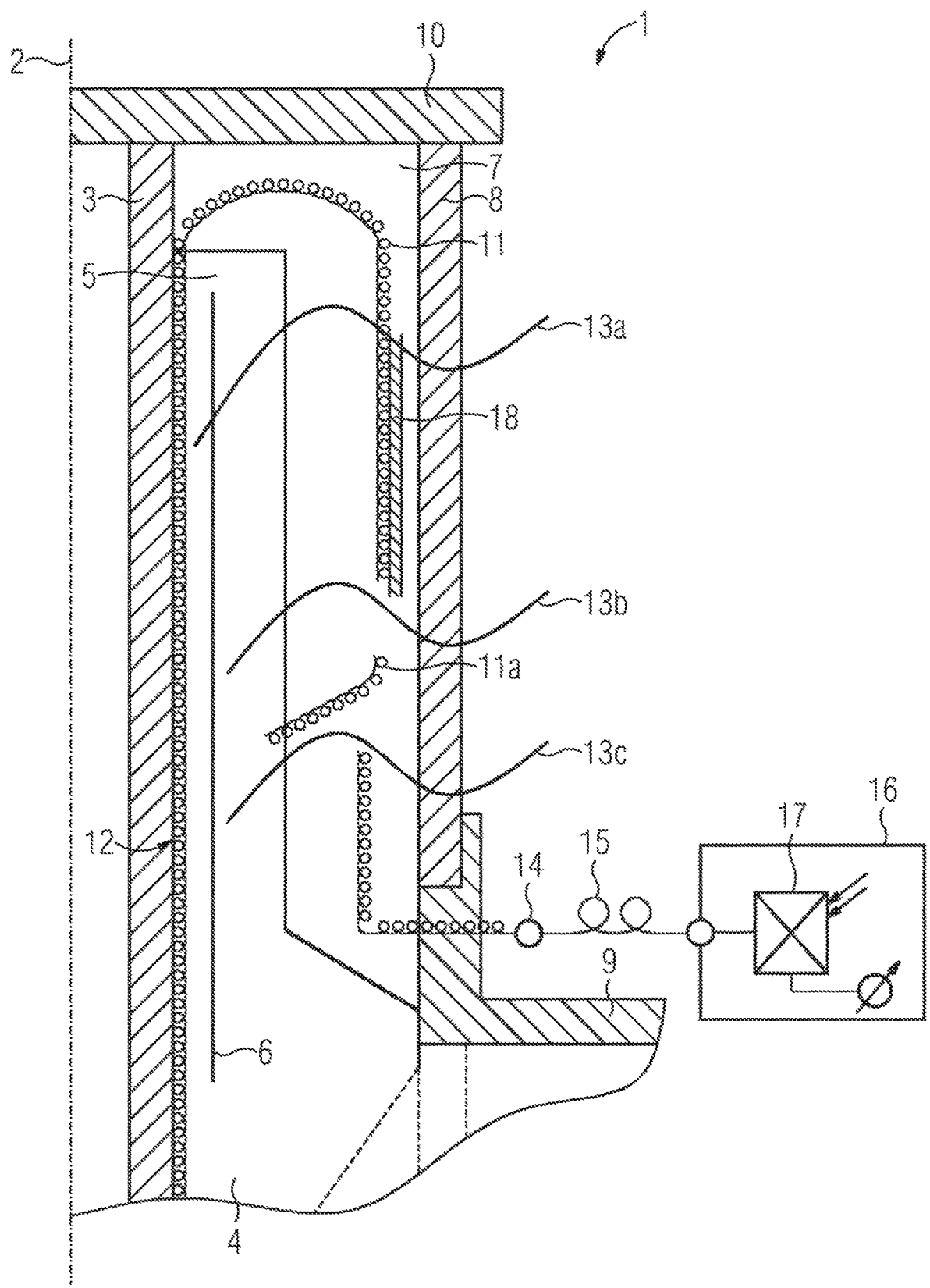

HIGH-VOLTAGE DEVICE FEATURING TEMPERATURE MEASUREMENT, AND METHOD FOR MEASURING THE TEMPERATURE OF A HIGH-VOLTAGE DEVICE

BACKGROUND OF THE INVENTION

Field of the Invention

The invention relates to a high-voltage device having an inner conductor and an insulating member that surrounds the inner conductor along the longitudinal direction thereof.

A high-voltage device of this type is known, for example, from WO 2015/172806 A1. The known high-voltage bushing is a high-voltage bushing, which is customarily employed for the routing of an inner conductor at a high-voltage potential through a partition which lies at a ground potential. For example, in the case of a transformer bushing, the partition constitutes a housing of a transformer.

Customarily, the high-voltage device forms part of a high-voltage installation which comprises a plurality of high-voltage components, such as transformers or switchgears.

The state of the high-voltage device is thus relevant, both to the reliability of the high-voltage device and to the reliability of the overall high-voltage installation to which the high-voltage device is connected.

SUMMARY OF THE INVENTION

The object of the invention is the disclosure of a generic high-voltage device, which is as reliable as possible in operation.

In a generic high-voltage device, this object is fulfilled by an optical waveguide which, at least in some sections, is guided on the inner conductor, is brought out of the insulating member and can be connected to an evaluation unit for the recording of measured temperature values.

During the operation of the high-voltage device, relatively high currents flow in the inner conductor. The temperature of the inner conductor rises as a result. The high-voltage device according to the invention provides an option whereby the temperature of the inner conductor, or of the insulating member in proximity to the inner conductor, can be accurately and reliably measured and evaluated. Methods for the measurement of temperature using light are already known to a person skilled in the art. For example, by means of the injection of a light signal into the optical waveguide, the spatially-resolved temperature can be determined by reference to Raman scattering. This method exploits a temperature-dependent scattering of light in the light-conducting optical waveguide. Evaluation of measured values then involves an investigation of the light wavelength of a light signal which traverses the optical waveguide. Moreover, relatively cost-effective measuring methods are known to a person skilled in the art, which permit the measurement of temperature on a single point of the optical waveguide only, for example at the end thereof.

Temperature measurement on the high-voltage device provides the advantageous option for the status monitoring of the high-voltage device. This can advantageously be exploited as a means of improving the reliability of the high-voltage device during the operation thereof.

In the high-voltage device according to the invention, the temperature can be measured with exceptional accuracy, as the optical waveguide is guided directly on the inner conductor. This is particularly advantageous in comparison with external temperature measurements, for example on an external housing of the high-voltage device. According to the invention, the optical waveguide is guided directly on the inner conductor, if the optical waveguide lies in contact with the inner conductor, or is arranged with a small clearance to the latter, for example not exceeding two centimeters. Depending on the construction of the high-voltage device, the optical waveguide can also be guided on a winding support which encloses the inner conductor, for example in the form of a light-gauge metal tube, or on an insulating layer which encloses the inner conductor.

Temperature measurement in the high-voltage device according to the invention is particularly reliable, as the measuring means required, specifically the optical waveguide, is already incorporated in the manufacturing of high-voltage device. Consequently, systematic measuring errors associated with the retrofitting of a measuring device will not occur.

Moreover, temperature measurement is also enabled during the operation of the high-voltage device according to the invention. Specifically, temperature monitoring is not restricted to laboratory tests. By the employment of the optical waveguide for the transmission of the measuring signal, the use of electrically conductive materials can advantageously be omitted. In this manner, the measuring signal can be routed directly from the inner conductor, which lies at a high-voltage potential, to the evaluation unit, which lies at a ground potential.

By means of the advantageous status monitoring of the high-voltage bushing per se, the high-voltage device according to the invention provides advantages with respect to a high-voltage installation in which the high-voltage device is employed. If the high-voltage installation is, for example, an energy transmission installation, temperature detection of the high-voltage device can then be employed for the optimization of any load regulation functions and/or load forecasts with reference to measured temperatures. This permits improved load flow control in the energy transmission installation as a whole (for example in a high-voltage DC transmission installation).

The evaluation unit is appropriately designed to generate a light signal, which can be injected into the optical waveguide. The evaluation unit can, moreover, pick up and evaluate the light signal from the optical waveguide. As already mentioned, evaluation of the light signal involves, for example, an investigation of the wavelength of the light signal which has passed through the optical waveguide.

Appropriately, the high-voltage device and/or the evaluation unit is equipped with appropriate means for the coupling and decoupling of the light signal.

Preferably, at least in some sections, the optical waveguide is guided on the inner conductor, along the longitudinal direction thereof. The optical waveguide can be guided in direct contact on the inner conductor, or with a small clearance to the inner conductor of less than two centimeters, in one of the electrically insulating layers which encloses the inner conductor. In this manner, an arrangement is provided for exceptionally accurate temperature measurement of the inner conductor.

According to an advantageous form of embodiment of the invention, the high-voltage device incorporates a fastening flange for the fastening of the insulating member, wherein the optical waveguide is routed through the fastening flange and is provided with a connector element, which is designed for connection to the evaluation unit. On the grounds of its mechanical strength, the fastening flange provides a particularly appropriate option for the fitting of the connector element. The optical waveguide can, for example, be routed through an auxiliary insulator, arranged between a resin-impregnated insulating member and a housing of the high-voltage device. The auxiliary insulator can comprise, for example, a gas or a synthetic foam, in which the optical waveguide is enclosed during the manufacture of the high-voltage device. For the connection of the optical waveguide to the connector element, the optical waveguide can be routed through an appropriate bore in the fastening flange.

According to one form of embodiment of the invention, the high-voltage device is a high-voltage bushing. The insulating member comprises, for example, an active part, having electrically conductive control inserts arranged concentrically around the inner conductor, which are separated from one another by insulating layers. The insulating layers can, for example, be comprised of an appropriate paper or synthetic material, which is impregnated with resin. The control inserts assume the function of field control, are arranged concentrically around the inner conductor, and are spaced from one another by means of the insulating layers.

According to one form of embodiment of the invention, the optical waveguide is routed around the active part. For example, the optical waveguide can be routed around the active part in a spiral arrangement.

The active part can be at least partially enclosed in an auxiliary insulator, wherein the auxiliary insulator is gaseous, paste-like or in the form of a foam, and the optical waveguide, in at least some sections, is routed through the auxiliary insulator.

According to one form of embodiment of the invention, the optical waveguide, at least in some sections, is routed along the auxiliary insulator by means of guide elements.

Alternatively, or in combination, the optical waveguide, at least in some sections, can be guided on the auxiliary insulator in a freely suspended manner.

It should be observed that, in conjunction with the invention, it may be advantageous if the high-voltage device according to the invention comprises a plurality of optical waveguides. In this manner, measurement of the temperature of the inner conductor can be executed with greater accuracy. Consequently, all the above-mentioned characteristics may apply to further optical waveguides, which are provided with the high-voltage device according to the invention.

As already indicated above, the high-voltage device according to the invention is particularly appropriate for application in a high-voltage installation.

In this regard, the object of the invention is the disclosure of a high-voltage installation which is as reliable as possible in operation.

The object is fulfilled by a high-voltage installation having at least one high-voltage component at a high-voltage potential, in which the at least one high-voltage component is electrically isolated from the ground potential by means of the high-voltage device according to the invention.

The advantages of the high-voltage installation according to the invention proceed from the corresponding advantages of the high-voltage device according to the invention.

High-voltage components of the high-voltage installation can specifically include transformers, switchgears, converters, or similar.

The invention further relates to a method for measuring a temperature of an inner conductor of a high-voltage device, which is enclosed by an insulating member in its longitudinal direction.

The object of the invention is the disclosure of a method of this type which is as accurate and as reliable as possible.

The object is fulfilled by a generic method, in which a light signal is injected into an optical waveguide which, at least in some sections, is guided on an inner conductor, is brought out of the insulating member and is connected to an evaluation unit for the recording of measured temperature values, a measuring signal which is dependent upon the light signal is extracted from the optical waveguide, and the measuring signal is evaluated, in accordance with its temperature dependence, by means of the evaluation unit.

By the method according to the invention, temperature can be measured in a particularly accurate manner, as the optical waveguide is guided directly on the inner conductor. This is particularly advantageous in comparison with external temperature measurements, for example on an external housing of the high-voltage device.

As already described above, the method according to the invention is particularly reliable, as the measuring means required, specifically the optical waveguide, is already incorporated in the manufacture of the high-voltage device. Any subsequent systematic measuring errors associated with the retrofitting of a measuring device cannot occur.

Moreover, by the method according to the invention, temperature measurement is also possible during the operation of the high-voltage device according to the invention. Specifically, temperature monitoring is not restricted to laboratory tests. Advantageously, for the transmission of measured values to the evaluation unit, exclusively electrically-insulating components can be employed.

The temperature dependence of the measuring signal can be analyzed, for example, by the evaluation of a wavelength displacement in relation to the light signal which is injected into the optical waveguide. By the exploitation of physical effects which are known to a person skilled in the art, a point-based or spatially-resolved measurement of the temperature of the inner conductor can be executed by the method according to the invention.

The invention is further described hereinafter with reference to the exemplary embodiment represented in the FIGURE.

BRIEF DESCRIPTION OF THE DRAWING

The FIGURE shows a schematic representation of an exemplary embodiment of a high-voltage device according to the invention.

DESCRIPTION OF THE INVENTION

Specifically, the FIGURE represents a high-voltage device 1 according to the invention, which is a high-voltage bushing. The representation in the FIGURE shows the high-voltage device 1 in a partial cross-sectional view. The high-voltage device 1 is of a cylindrically symmetrical design. The axis of symmetry of the high-voltage device 1 is represented by the dash-dotted line 2.

The high-voltage device 1 comprises a hollow cylindrical inner conductor 3 of aluminum construction, which is enclosed by an insulating member 4 in a longitudinal direction along the line 2. Between the inner conductor 3 and the insulating member 4, a thin layer of a buffer material (not represented) can be arranged, in order to minimize mechanical stresses in the high-voltage device 1. In the context of the invention, the inner conductor is not necessarily a hollow conductor. The inner conductor can also be a solid conductor. As a further working material for the inner conductor, copper, for example, is also conceivable.

The insulating member 4 comprises an active part 5, which is comprised of insulating layers which are constituted of paper, and are separated by electrically conductive control inserts 6. The insulating layers are impregnated with epoxy resin, such that the active part 5 constitutes a solid block. Externally to the active part 5, an auxiliary insulator 7 of a dry foam material is arranged. According to further examples, the auxiliary insulator can be an insulating gas or a combination of a plurality of such materials.

The insulating member 4 is enclosed in a housing 8. One part of the housing 8 constitutes a fastening flange 9, which is provided for the fastening of the high-voltage device 1 to a partition of a high-voltage component. At the top end, the high-voltage device 1 is closed by a cover 10.

The high-voltage device 1 further comprises an optical waveguide 11 which, in some sections, is guided on the inner conductor 3. Here, in a detection region 12, the temperature of the inner conductor 3 is measured in a point-based or spatially-resolved manner. The course of the optical waveguide 11 is schematically represented in the FIGURE in a plurality of sections, wherein the sections are identified by curved lines 13a, 13b and 13c. It should be observed here that the sections 13a-c are represented adjacently to one another, in accordance with one exemplary embodiment. However, it is also conceivable for the routing of the optical waveguide according to sections 13a-c to encompass alternative waveguide routing options. Accordingly, the optical waveguide 11, on the inner conductor 3, can be routed, for example, through the buffer material in the active part 5. It is thus not necessary for the optical waveguide 11 to lie in contact with the inner conductor 3. The course of the optical waveguide 11 is then routed back through the auxiliary insulator 7 in the direction of the fastening flange 9. In the intermediate section 13b-c, the optical waveguide 11 is routed around the active part 5, which is represented in the diagram by a correspondingly curved section 11a of the optical waveguide 11. In section 13a-13b, appropriate retainers and guide elements 18 are provided on the optical waveguide for the purposes of localized attachment. In the intermediate section above the line 13a, the optical waveguide 11 is routed in free suspension through the auxiliary insulator 7. The optical waveguide 11 is brought out of the housing 8 of the high-voltage device 1 through a bore in the fastening flange 9. Here, the optical waveguide 11 is connected to a connector element 14.

A connecting line 15 connects the connector element 14 to an evaluation unit 16. The evaluation unit 16 is designed, by means of a photoelectric unit 17, to convert light signals into electrical signals, from which a measured temperature value can be determined.

The temperature measurement method according to the invention is described hereinafter in progressive steps, with reference to the exemplary embodiment represented in the FIGURE.

Firstly, a light signal is generated in the evaluation unit 16. The light signal is injected into the optical waveguide 11 via the connecting line 15 and the connector element 14. The light signal traverses the optical waveguide 11, specifically including the detection region 12. The light signal varies in accordance with the temperature of the inner conductor 3. Thereafter, the light signal is routed back through the optical waveguide 11 to the connector element 14, where it is extracted from the optical waveguide in the form of a measuring signal which is dependent upon the light signal, and is routed to the evaluation unit 16. The light signal can be mirrored at one end of the optical waveguide, or can also be fed back to the connector element by the parallel routing of the optical waveguide (not represented in the FIGURE). The evaluation unit 16 converts the measuring signal into an electrical signal. Thereafter, the measuring signal, by means of a data processing unit which is integrated in the evaluation unit, is converted into a measured temperature value. This can also be executed during the operation of the high-voltage device, where the inner conductor 3 thus lies at a high-voltage potential, and the evaluation unit 16 is close to the ground potential.

The invention claimed is:

1. A bushing, comprising:
   an inner conductor;
   an insulating member surrounding said inner conductor along a longitudinal direction thereof, said insulating member having an active part with electrically conductive control inserts disposed concentrically around said inner conductor, said electrically conductive control inserts being separated from one another by insulating layers;
   an evaluation unit; and
   at least one optical waveguide which, at least in some sections, is guided on said inner conductor, is brought out of said insulating member and is connected to said evaluation unit for recording a light signal injected into said at least one optical waveguide and, said evaluation unit determining measured temperature values of said inner conductor using the light signal from said at least one optical waveguide.

2. The bushing according to claim 1, wherein said optical waveguide, in some sections, is guided on said inner conductor by lying on said conductor.

3. The bushing according to claim 1,
   further comprising a fastening flange; and
   wherein said optical waveguide is routed through said fastening flange and has a connector element configured for connection to said evaluation unit.

4. The bushing according to claim 1, wherein said optical waveguide, in some sections, is routed around said active part.

5. The bushing according to claim 1, further comprising an auxiliary insulator, said active part is at least partially enclosed in said auxiliary insulator, said auxiliary insulator is gaseous, paste-like or in a form of a foam, and said optical waveguide, in at least some sections, is routed through said auxiliary insulator.

6. The bushing according to claim 5, further comprising guide elements, said optical waveguide, at least in some sections, is routed along said auxiliary insulator by means of said guide elements.

7. The bushing according to claim 5, wherein said optical waveguide, at least in some sections, is guided on said auxiliary insulator in a freely suspended manner.

8. A method for measuring a temperature of an inner conductor of a high-voltage device, which comprises the steps of:
   providing a bushing according to claim 1;
   injecting a light signal into the optical waveguide which, at least in some sections, is guided on the inner conductor, is brought out of the insulating member and is connected to the evaluation unit for recording of measured temperature values;
   extracting a measuring signal, which is dependent upon the light signal, from the optical waveguide; and evaluating the measuring signal by means of the evaluation unit, in accordance with a temperature dependence thereof.

9. An electrical installation, comprising:

a bushing containing an inner conductor, an insulating member surrounding said inner conductor along a longitudinal direction thereof, an evaluation unit, and at least one optical waveguide which, at least in some sections, is guided on said inner conductor, is brought out of said insulating member and is connected to said evaluation unit for recording a light signal injected into said at least one optical waveguide and, said evaluation unit determining measured temperature values of said inner conductor using the light signal from said at least one optical waveguide, said insulating member having an active part with electrically conductive control inserts disposed concentrically around said inner conductor, said electrically conductive control inserts being separated from one another by insulating layers; and at least one component at a given potential being electrically isolated from a ground potential by means of said device.

* * * * *